INVENTORS
JOHN L. PETERS
ERIC J. ISBISTER
BY
ATTORNEY

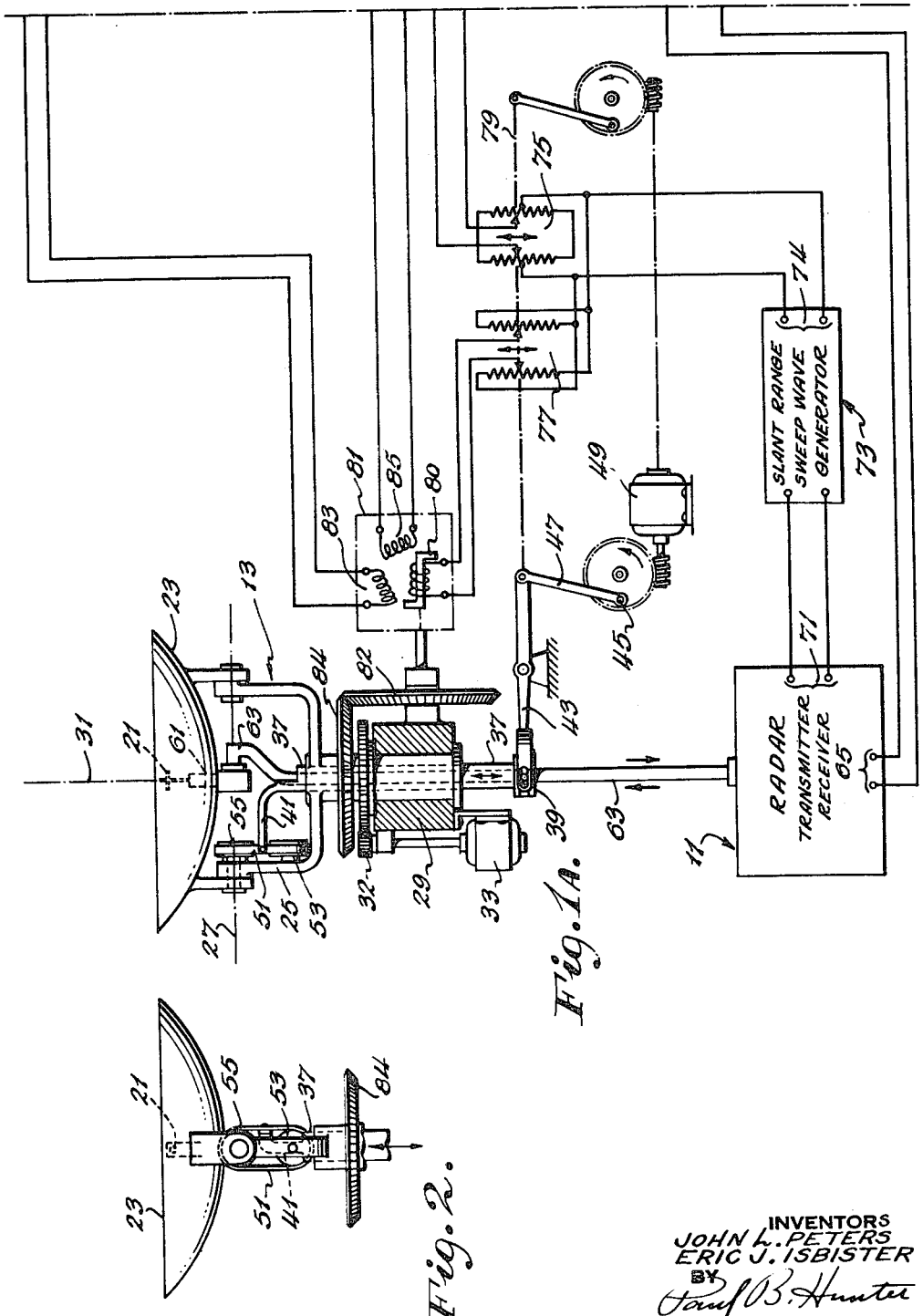

INVENTORS
JOHN L. PETERS
ERIC J. ISBISTER
BY
Paul B. Hunter
ATTORNEY

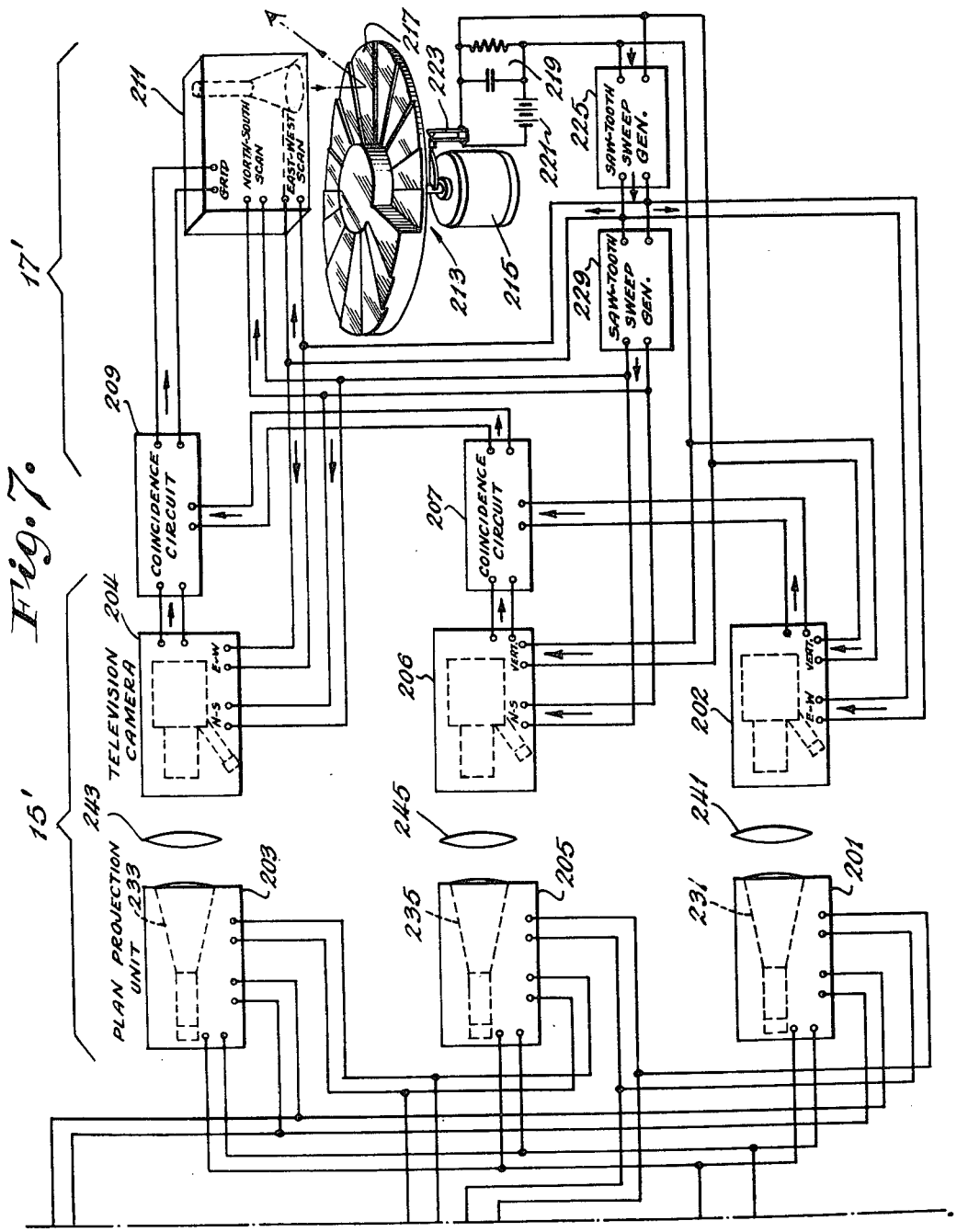

Patented Apr. 28, 1953

2,637,023

UNITED STATES PATENT OFFICE 2,637,023

OBJECT LOCATION APPARATUS WITH THREE-DIMENSIONAL SCALAR REPRESENTATION

John L. Peters, Hempstead, and Eric J. Isbister, Garden City, N. Y., assignors to The Sperry Corporation, a corporation of Delaware Application March 28, 1947, Serial No. 737,906

13 Claims. (Cl. 343—10)

The present invention relates to the detection and positional representation of objects such as aircraft, and is particularly concerned with the presentation of an object distribution pattern appearing as a three-dimensional scalar representation of the positions of the detected objects.

This is a continuation-in-part of United States patent application Serial No. 703,060, now Patent No. 2,602,921, filed October 12, 1946 by the present inventors.

An objective of the present invention is the representation of the spatial distribution of objects, e. g., aircraft, in such a way that an observer is readily apprised of the positions and directions of movement of the objects or craft, so that he is enabled to supervise or regulate the operation of one or more of them to avert collisions.

Apparatus has heretofore been devised for development of a three-dimensional spatial representation of significant patterns, as set forth in United States Patent 2,361,390, issued October 31, 1944 to Thomas M. Ferrill, Jr., and assigned to the assignee of the present application. It is an object of the present invention to provide an object detection system, such as a radar system, incorporating such a three-dimensional presentation apparatus for directly portraying the positional distribution in space of the objects, such as aircraft, within a predetermined space volume.

In accordance with an important feature of this invention, a highly directive radar system located at a selected point in space is arranged for directional search scanning throughout a space volume thereabout, and for obtaining data representing the angle of elevation and azimuth angle and the distance or slant range of each detected object within the volume searched. Apparatus is provided for derivation from this spherical coordinate data of Cartesian coordinate data as to the object positions, and for timely transfer of the Cartesian coordinate data to a suitable arrangement for three-dimensional indication, e. g., an arrangement of the type set forth in Patent 2,361,390, referred to above.

The invention also relates to the novel features or principles of the instrumentalities described herein, whether or not such are used for the stated objects, or in the stated fields or combinations.

The above objects and features of the present invention will become more apparent, and other objects will be indicated in the following description of preferred embodiments of the invention, considered in reference to the drawings, wherein:

Figs. 1-A and 1-B together constitute a diagram of an object detection and representation system incorporating the features of the present invention;

Fig. 2 is a fragmentary diagram showing a mechanical detail of the mechanism illustrated in Fig. 1-A;

Fig. 7 is a diagram of a modified version of the present invention.

Figure 1B:
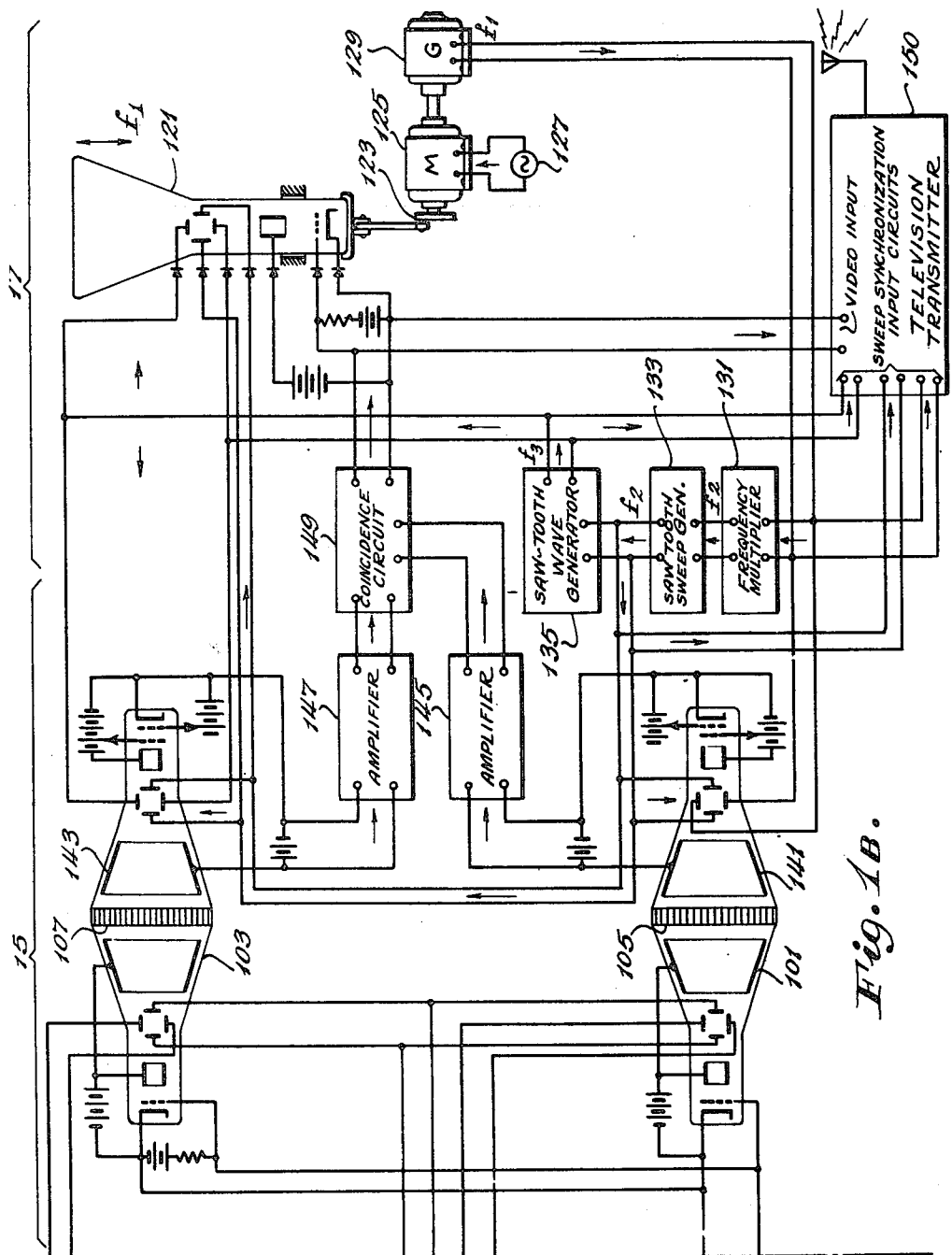

Referring now particularly to Figs. 1-A and 1-B, there is shown a radar transmitter-receiver apparatus 11 of the type shown in the textbook Principles of Radar, 1944, 1946, Massachusetts Institute of Technology, coupled to a directive antenna 13 which is flexibly supported and arranged for regular scanning throughout a hemispherical space volume extending upward from the horizon. A component resolving image transfer system 15 (Fig. 1-B) is provided for development of significant electronic charges positioned according to selected pairs of rectangular or Cartesian coordinates corresponding to the positions of detected objects. A three-dimensional presentation arrangement 17 is provided for utilizing these charge-images and for portraying, three-dimensionally, a representation of the objects detected through the operation of the radar antenna 13 and the transmitter-receiver unit 11.

The regular directional scanning of an antenna throughout a space volume may be accomplished either mechanically or electronically, or with a system combining these functions. Electronic antenna directivity scanning systems are illustrated and claimed in U. S. patent application Serial No. 545,580, now Patent No. 2,437,281 filed July 19, 1944 by Gereld L. Tawney for High Frequency Radiant Energy Apparatus. Employment of electronic directivity variation enables higher scanning speeds to be accomplished, and hence is somewhat more desirable for use in the present invention. However, the arrangement 13 is illustrated as a fully mechanical scanning system, in the interest of simplicity.

This system includes a radiator element 21 positioned at the focal point of a paraboloidal reflector 23. The reflector 23 is pivotally supported in a yoke 25 for freedom about a nod axis 27 perpendicular to the principal axis of the paraboloidal reflector 23. The yoke 25, in turn, is pivotally supported in a vertical main bearing 29, referred to as the spin bearing, for permitting high-speed rotation of the yoke and the antenna unit carried thereby about spin axis 31 perpendicular to the nod axis 27.

The yoke 25 is coupled as through a gear train 32 to a spin drive motor 33. The antenna 21, 23 is coupled as through an axially translatable tubular member 37 to a nod drive motor 49. Member 37 has a collar 39 at one end thereof coupled to a pivoted lever arm 43 driven through a crank pin 45 and connecting rod 47 by the nod drive motor 49. An arm 41 at the upper end of tubular sleeve 37 is coupled to the antenna apparatus 21, 23 through any selected arrangement for transfer from translatory oscillation to a rotational oscillation of the antenna apparatus about the nod axis 27. Fig. 2 shows an illustrative arrangement for this purpose, wherein the arm 41 is connected to a belt or chain 51 operated over an idler pulley 53 pivotally supported in yoke 25 and a pulley or sprocket 55 affixed to the antenna unit 21, 23 coaxially with the nod axis 27. Through this arrangement, the rotation of the crank 45 by motor 49 produces translatory oscillation of the sleeve 37 and arm 41, in turn causing oscillation of the antenna apparatus 21, 23 about the nod axis 27. The operating speeds of motors 33 and 49 and the gear ratios of the connecting arrangements preferably are selected for producing many spin cycles or revolutions of the antenna apparatus about spin axis 31 during each nod cycle of the antenna 21, 23 about the nod axis 27.

The dipole element 21 located substantially at the focal point of the paraboloidal reflector 23 is coupled through a wave guide section 61 to a coaxial transmission line section 63 extending coaxially through sleeve 37 down to radar transmitter-receiver unit 11.

A sawtooth sweep wave generator 73 is coupled to the radar transmitter-receiver unit 11, and arranged to produce a sawtooth sweep wave of frequency equal to the repetition frequency of recurrent high-frequency energy pulses transmitted through antenna 21, 23 by unit 11. This sweep wave generator is synchronized with the pulse transmission in such a way that the voltage between the generator output terminals 74 at any instant is proportional in a predetermined ratio to the slant range of (i. e., the distance to) an energy-reflecting object from which a reflected high-frequency energy pulse is received at that instant.

If the three-dimensional indicator were so arranged that the movement (or apparent movement) of its presentation screen could be synchronized with the scanning of the antenna in such a way that the presentation screen position would scalarly correspond in height to the heights of all detected objects at the moments of reception of pulses reflected therefrom, then the output signals from the radar receiver could be applied directly to the control grid of the presentation oscilloscope, and the scanning circuits could be coupled directly to the antenna rotating mechanism, as in a Plan Positional Indicator radar system. Such synchronization is not feasible, however, in view of the dissimilarity of characters of the radar directional scanning system and the presentation arrangement. Therefore, an image transfer arrangement 15 is provided for temporary storage of significant data from the radar units 11, 13 and for timely delivery of control signals to the grid control circuit of the presentation oscilloscope. The transfer arrangement 15 comprises a plurality of electronic transfer devices, illustrated in Fig. 1-B as two electron-image storage tubes 101 and 103, of a type developed for obviating absolute synchronization between two television channels, and permitting a selected time delay between the scan cycles thereof. Storage tubes of the general type illustrated at 101, 103 are illustrated and described in pages 326 and 327 in the textbook "Television" by V. K. Zworykin and G. A. Morton, John Wiley & Sons, 1940.

Storage tubes 101 and 103 are used in the present invention not only for permitting time delay between input and output sections but also for transformation between different types of scan rasters. Each storage tube comprises an input electron gun embodying a cathode, an intensity control electrode, accelerating and focussing electrodes, and mutually perpendicular deflecting circuits which may employ pairs of electrostatic plates; an electronic storage mosaic for holding elemental electronic charges at points of impingement thereon of the input electron beam; and an output electron gun arranged to permit output electron beam scanning and intensity control. An output electrode is provided for receiving electrons driven by the output electron beam from the mosaic, and hence for providing an output voltage varying according to the electronic charges of successive mosaic elements sequentially traversed by the output electron beam.

The input electron gun of each of the storage tubes 101 and 103 is coupled to the radar units 11, 13 for the development of elemental electron charges at significant points on the respective mosaics 105 and 107 corresponding to an elevation projection of object position and plan projection of object position, respectively, the scanning of the electron beams in these input electron guns being regulated according to the direction of aiming of the antenna 21, 23 and also according to variations of output voltage from the slant range sweep wave generator 73. Receiver output terminals 65 of the radar transmitter-receiver unit 11 are connected to the control grid circuits of both of the input electron guns for permitting input electron beam impingement upon the mosaics only at the moments of reflected pulse reception, and hence at points on these mosaics determined according to a selected function of target range and direction.

The output electron guns are connected for output electron beam deflection synchronously with the scanning of the three-dimensional oscilloscope indicator unit 17, and circuit arrangements are provided for permitting electron beam activation of the fluorescent screen in the indicator 17 only at those moments when output voltage pulses are simultaneously produced by storage tubes 101 and 103 by virtue of impingement of their output electron beams upon mosaic elements bearing object-representing electron charges. In this way, point activation of the fluorescent screen of the indicator 17 is accomplished at the points in the object representation volume corresponding scalarly with the positions of the radar detected objects, these points being determined by reliance upon orthographic projection data developed in the storage tubes 101, 103.

The input electron beams of storage tubes 101 and 103 are swept horizontally in synchronism according to such a simultaneous function of the range sweep output voltage at terminals 74 and the direction of aiming of antenna 21, 23 that the input beam impingement spots (at a moment of energization of the input electron beams by an output pulse from receiver output terminals 65 of unit 11) are deflected from the vertical median planes of the storage tubes by extents proportional to the linear displacement of the pulse-reflecting object from a selected vertical plane passing through the radar scanning system 13, e. g., from the north-south vertical plane passing through axis 31. For this purpose, the range sweep wave from generator 73 is supplied to the input terminals of a dual potentiometer unit 77 linked as indicated at 79 to the nod movement-producing mechanism 43, 45, 47, 49 in the directional scanning system 13. The dual potentiometer unit 77 is so arranged as to provide an output voltage version corresponding generally in wave form to the saw-tooth output voltage of range sweep wave generator 73, but having an amplitude varying in proportion to the sine of the angle $a$ (see Fig. 5) of deviation between the directive axis of antenna 21, 23 and the normally vertical spin axis 31 of the signal system. The voltage at any instant between the output taps of the dual potentiometer unit 77 therefore corresponds to the horizontal component of distance to an object from which a reflected energy pulse is received at that instant.

The output voltage between the taps of dual potentiometer unit 77 is supplied to a further functional transformation unit 81 arranged to provide output voltages corresponding generally in wave form to the saw-tooth waves supplied at the output taps of dual potentiometer unit 77 but varying in amplitude as the sin and cos, respectively, of the angle of revolution $\theta$ (Fig. 5) of the yoke 25 and antenna 21, 23 about the vertical axis. These angles of revolution may be taken with reference to a selected vertical median plane passing through the axis 31, e. g., the north-south vertical plane.

Figure 3:
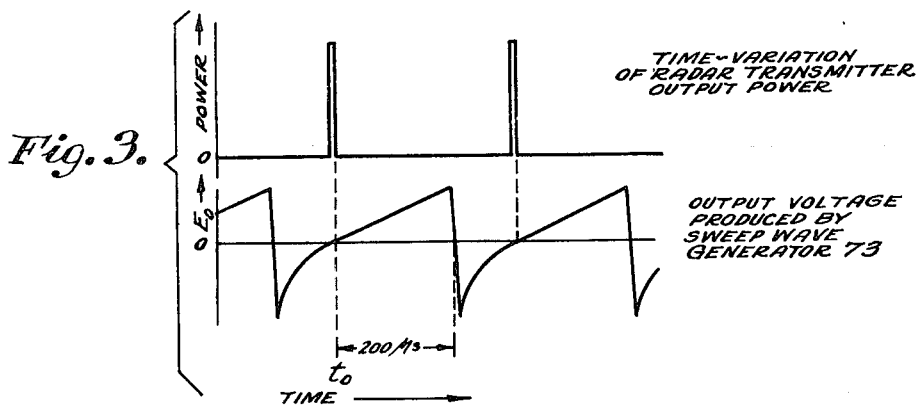
Fig. 3 is a graphical representation of voltages involved in the apparatus of Fig. 1.

The output circuit 85 of the functional unit 81 in which is developed a voltage version varying in amplitude as the sin of the angle of revolution $\theta$ of the antenna from a northerly aiming is connected to the horizontal deflection plates of the input electron guns of both storage tubes 101 and 103. The other output circuit 83 of device 81, in which is developed a voltage version varying according to cos $\theta$, is connected to the other deflection plates of the input electron gun of the plan projection storage tube 103, in order to deflect the beam thereof transversely according to the distances of the detected objects from the east-west vertical plane passing through axis 31. The unit 81 is illustrated as a multiple-winding variable transformer or transmitter unit such as a 90° selsyn unit, coupled through a 1:1 ratio gear coupling system including gears 82 and 84 to the yoke 25 for revolution of the rotor unit 80 in synchronism therewith. In order for this induction transfer unit to provide zero output voltage in both output windings at the moments of radar pulse transmission and to provide substantially linearly increasing voltage during an appreciable part of each interval between successive moments of radar pulse transmission, the output wave form of generator 73 may be such a wave form as is shown in Fig. 3. This alternating voltage wave passes through the zero-voltage axis at the moments of pulse transmission, and rises substantially linearly thereafter.

Figure 4:
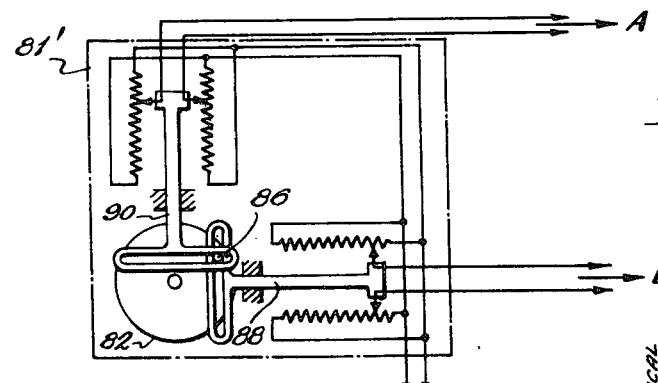
Fig. 4 is a diagram of a modification of the arrangement in Fig. 1.

If preferred, a sine dual-potentiometer assembly and a cosine dual-potentiometer assembly may be used in a functional transfer unit 81', organized as in Fig. 4, replacing the inductive transfer unit 81. The structure 81', in Fig. 4 includes a crank pin 86 on the mitre gear 82, operating in cross slots in linearly translatable potentiometer control arms 88 and 90. The elements of the potentiometers are wound for a uniform high resistance gradient throughout, the overall resistance value of each element being appreciably greater than the resistance values of dual-potentiometer unit 77. Unit 81' may be used with such a wave form as is shown in Fig. 3, but it affords great latitude as to the wave form of the output voltage from generator unit 73, in view of the transfer therethrough of direct current as well as alternating current components of the saw-tooth wave.

There is provided also a dual potentiometer unit 75 connected to the output terminals 74 of sweep wave generator 73 and operated by the linkage 79 according to the nod angle of the antenna 21, 23. This dual potentiometer unit is so arranged as to provide maximum output amplitude when antenna 21, 23 is aimed along the spin axis 31, and the amplitude of the saw-tooth voltage between the movable taps of this dual potentiometer unit 75 decreases proportionally to cos $a$ as the antenna is nodded downwardly by the action of motor 49. The output voltage between the taps of dual potentiometer unit 75 is supplied to the input gun vertical deflection plates of the elevation projection storage tube 101 for deflecting the input electron beam upward to a height proportional to the altitude of a detected object. With these arrangements, at the moment of reception of a reflected energy pulse from a distant object, the input electron beams of the storage tubes 101 and 103 are simultaneously permitted to deliver electron charges to significant points on the respective mosiacs 105 and 107, these points scalarly corresponding in position to the respective projections of the energy reflecting object upon a vertical east-west plane and upon the horizontal plane.

The presentation apparatus 17 includes a cathode ray tube 121 arranged for oscillation at a frequency of the order of 20 cycles per second along a vertical axis through an eccentric crank driving arrangement 123 on a driving motor 125, which is supplied by an electric power source 127. A synchronization voltage generator 129 is coupled to the motor 125 and crank 123 for producing a sinusoidal alternating output voltage corresponding in phase and frequency with the vertical movement of the cathode ray tube 121. This sinusoidal output voltage is applied to the vertical deflection plates of the output electron gun in the elevation projection storage tube 101 for sweeping the electron beam thereof vertically in synchronism with the vertical movement of the fluorescent screen of cathode ray tube 121.

This voltage is also supplied to the input terminals of a frequency multiplier 131 and the output circuit of the frequency multiplier 131 is arranged to supply a frequency-control voltage of a much higher frequency, e. g. of the order of 600 cycles per second, to input terminals of a saw-tooth sweep generator circuit 133. The saw-tooth output voltage produced by circuit 133 is supplied to the horizontal deflection plates of the elevation storage tube output electron gun and to the lateral deflection plates of the plan storage tube output electron gun, and also to the east-west deflection plates of the presentation cathode ray tube 121, for deflecting the electron beams of these tubes synchronously in directions corresponding to the horizontal east-west direction. A further saw-tooth wave generator 135 which may have input synchronization terminals connected to the output circuit of unit 133 is arranged to supply a high-frequency saw-tooth sweep voltage, e. g., a 30,000 cycle per second sawtooth voltage, to the transverse deflection plates of the plan storage tube output electron gun and to the north-south deflection plates of the presentation cathode ray tube 121, for synchronous deflections of the associated electron beams in directions corresponding to the horizontal north-south direction.

The electron collector output electrodes 141 and 143 of the storage tubes 101 and 103, respectively, are connected to the input circuits of amplifiers 145 and 147, respectively, and the output circuits of these amplifiers are connected to the input circuits of a coincidence unit 149, arranged to provide output voltage only at moments of simultaneous input signal applications by amplifiers 145 and 147. Coincidence circuits are well known, a representative unit of this type comprising an electron discharge tube such as a pentode having two grids (e. g., a control grid and suppressor grid) each normally biased to such high negative potentials as to prevent electronic current to the anode even when the bias applied to either the control grid or the suppressor grid is momentarily overcome. In such an arrangement, simultaneous positive voltages must be applied to the control grid and to the suppressor grid in order to permit the flow of electronic currents to the anode, and hence to develop an output signal in the anode circuit. The output circuit of the coincidence unit 149 is connected to the grid circuit of the cathode ray tube 121 which normally is so biased as to prevent impingement of an active electron beam upon the fluorescent screen of the cathode ray tube.

The north-south and east-west deflections of the output gun electron beam in the plan storage tube 103 are accompanied by corresponding north-south and east-west deflection voltages, respectively, in the deflection circuits of the presentation tube 121; and the vertical deflection and horizontal deflection of the output gun electron beam in the elevation projection storage tube 101 correspond at all times with the height of the screen and the east-west deflection voltage, respectively, of the presentation tube 121. At a moment when the output electron beams of units 101 and 103 both impinge upon highly charged mosaic elements, producing simultaneous output impulses at collector electrodes 141 and 143, the amplifiers 145 and 147 and the coincidence circuit unit 149 cooperate to cause momentary energization of the electron beam in tube 121. The momentary impingement of the electron beam on the fluorescent screen of tube 121 occurs at a point corresponding scalarly, in height as well as in plan position, with the location of the energy reflecting object from which radar energy was reflected to cause the simultaneous deposits of electron charges on the mosaics 105, 107.

Where energy reflecting objects are at various points within the space volume searched by the radar scanning system 13, a plurality of luminous points are seen within the miniature space volume through which the fluorescent screen of the cathode ray tube 121 regularly oscillates; the positions of these luminous images corresponding scalarly in height as well as plan position with the positions of the objects reflecting radar energy to the scanning antenna apparatus 13. Hence, this arrangement is ideally suited for use as an aircraft monitoring system, as for service in the vicinity of an airport where air traffic control supervisors are enabled to rely upon the three-dimensional object pattern to guide them in issuance of flight instructions to the operators of the several aircraft simultaneously represented in the vicinity.

Figure 5:
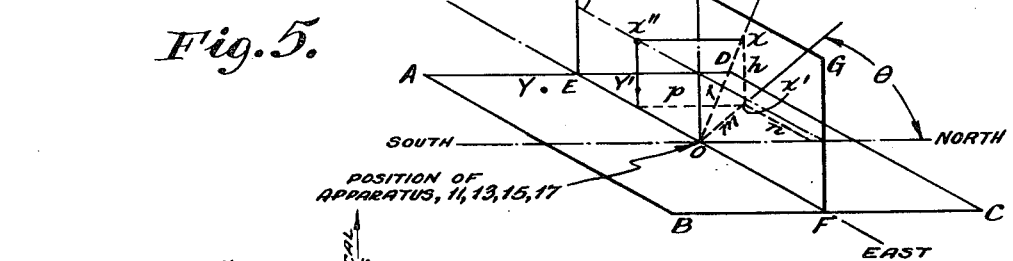
Figs. 5 and 6 are diagrams indicating the space position of a point both in terms of spherical coordinates and in terms of Cartesian coordinates and also indicating the positions of selected projection planes for consideration in reference to object positions.

Fig. 5 shows a geometrical diagram representing at point O the position occupied by the scanning system 13. In this diagram, the position of a radar energy reflecting object is represented at point X, being at a height $h$ above the level of the radar scanning observation point O and at a slant range or straight-line distance $r$. The direction of the target at point X is defined by the azimuthal angle $\theta$ measured from the north direction to the line OX' passing through the projection X' of point X in the horizontal plane ABCD, and by the angle $a$ measured from the vertical axis 31 to the line OX. The plan-position projection plane corresponding to a selected rectangular area on the mosaic 107 of storage tube 103 and a similar rectangular area of the fluorescent screen of cathode ray tube 121 is represented by the rectangle ABCD in Fig. 5; while the vertical-plane projection rectangle related to the useful area of the elevation projection storage tube mosaic 105 is represented by the rectangle EFGH in Fig. 5.

As will be apparent from examination of this diagram, the plan projection point X' falls at a distance $m$ given by $r \sin a$, and the rectangular coordinates $n$, $p$ of the plane projection point X' are given by $r \sin a \sin \theta$ and $r \sin a \cos \theta$, respectively. The east-west vertical plane projection X'' is similarly located in the east-west vertical projection plane EFGH by coordinates $n$, $h$, where $h$ is given by $r \cos a$. Projection points X' and X'' in Fig. 5 correspond scalarly with the positions of the electronic charge points on mosaics 107 and 105, respectively, and hence a single illumination point in the volume swept by the screen of tube 121 is accurately determined through simultaneous contemplation of the electron charge positions on mosaics 105, 107.

It will be observed from comparison of the elevation scan frequency and the horizontal scan frequencies of representation arrangement 17 that many cycles of east-west scan of the electron beams are accomplished during each cycle of vertical oscillation of the tube 121, and further, that a very large number of north-south scan cycles occur in the interconnected north-south scan circuits of tubes 103 and 121 during an east-west scan cycle. Thus, the mosaic area in tube 103 and the fluorescent screen area in tube 121 corresponding to the rectangle ABCD in Fig. 5 are swept or scanned by the corresponding deflection circuits through a complete cycle, corresponding generally to a sweep through a television scan raster or television "frame," in a period of the order of $\frac{1}{600}$ second, and such a substantially horizontal "frame" is repeated recurrently as tube 121 moves vertically upward through many repetitions, e. g. through frame scans and again, there are a large number (e. g. fifteen) of substantially horizontal frame scans as the tube moves downward in the return sweep of the vertical scan cycle. It will be observed further that the output gun electron beam impingement spot in storage tube 101 progresses at a moderate speed along a line in mosaic 105 corresponding to an almost horizontal east-west line in plane EFGH as the successive north-south rapid scan lines on mosaic 107 are traversed in the progress in the east-west direction.

As the fluorescent screen of tube 121 arrives at the height corresponding scalarly to the height $h$ of the object point X (Fig. 5), the output electron beam impingement spot on mosaic 105 progresses along the nearly horizontal line 161 passing through the point of high-density electron charge corresponding to projection point X''. During the passage through this point on mosaic 105 corresponding to projection point X'', the output gun electron beam in plan projection storage tube 103 is making extremely rapid traversals along closely spaced lines in mosaic 107 corresponding to a group of very closely spaced north-south lines in plane ABCD passing through horizontal plane projection point X' and points immediately adjacent thereto. The collector electrode 141 of storage tube 101 receives an output impulse having a duration corresponding to the period of a north-south sweep cycle, i. e., a period of the order of $\frac{1}{30,000}$ second as the output gun electron beam moves through the point on mosaic 105 corresponding to projection point X''.

During this interval of output signal at collector electrode 141, the output gun electron beam in storage tube 103 passes rapidly through a point on plan projection mosaic 107 corresponding to projection point X', a time interval of the order of 1 microsecond being required for the passage of the beam through the elemental charge area corresponding to point X'. Accordingly, there is produced at collector electrode 143 an output voltage impulse of duration of the order of one microsecond, occurring in the duration of the longer output impulse developed at collector electrode 141. The concurrence or time-coincidence of the impulses at electrodes 141 and 143 causes a beam energizing signal to be supplied by unit 149 to the control grid of presentation cathode ray tube 121, producing spot illumination thereof at a point in the presentation volume scalarly representing the position of point X, in the manner generally described before.

If desired, full electrical signal data corresponding to the operation of tube 121 may be transmitted as by a television transmitter 150, the transmitted radio-frequency energy being modulated according to a composite modulation wave including the video signals applied to the grid of tube 121 and regular signal impulses for synchronization of the sweeps in a remote three-dimensional indicator with the sweeps in indicator 17. A remote indicator like indicator 17 then may be connected to a radio receiver and scanned in the manner of a conventional television receiver, the receiver cathode ray tube also being oscillated synchronously with the oscillation of tube 121.

A complete frame scan of mosaic 107 in tube 103 occurs coincidentally with each line scan in tube 101, and hence the successive scan frames in tube 103 correspond to successive levels of the fluorescent screen of tube 121. The electron charge on mosaic 107 positioned according to projection point X' is traversed at least once during each frame scan thereof, and, hence the output pulses of the order of 1 microsecond duration occur at electrode 143 at intervals equal to the period of generator 133, i. e., periods of the order of $\frac{1}{600}$ second. However, those output pulses at electrode 143 which do not occur during output pulses at electrode 141 are incapable of causing unit 149 to energize the presentation tube grid; otherwise the presentation tube screen would be spot-illuminated at a succession of vertically stacked points, and thus would generate a vertical luminous line extending in height throughout the range of oscillation of the presentation tube screen.

The three-dimensional object position indicating system of Fig. 1 is subject to indicated ambiguities in special cases where two objects, such as two aircraft in the vicinity of the radar station, are found to occupy a common vertical plane perpendicular to plane EFGH in Fig. 5, i. e., to be in a common north-south vertical plane. If these objects are at equal altitudes, or if their plan projections coincide, then they will be accurately represented in the three-dimensional image volume, and no improper images will appear. However, if they are at unequal altitudes and are not vertically aligned, then two false images will be produced in addition to the two images properly positioned to represent the energy reflecting objects. These false images will appear in the same north-south vertical plane, and will occur at the diagonally opposite corners of a rectangle having horizontal and vertical sides and having the other two corners at the true images of the energy reflecting objects.

Thus, for so long as two energy reflecting objects remain at equal displacements from the median north-south vertical plane passing through point O, an ambiguity can result, with four images appearing instead of two. It will be apparent that this condition can lead to serious confusion, which can be multiplied if more than two objects are in a common north-south plane, the different objects being at different altitudes and not vertically aligned—the total number of images (including genuine images and false images) thus produced increases as the square of the number of objects at different altitudes in a common north-south vertical plane.

Figure 6:
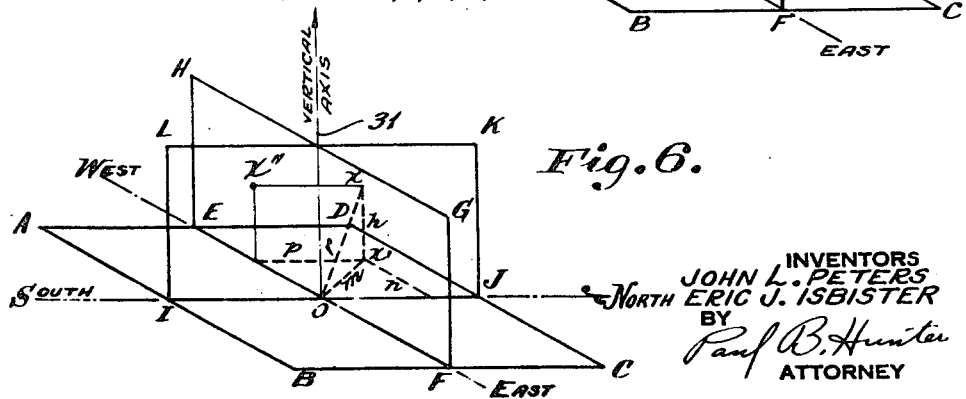

This possibility of erroneous indications can be overcome by use of a third image transfer device arranged to be operated in accordance with the projections of the object positions upon a north-south vertical plane IJKL, as represented in Fig. 6. An arrangement of this type is shown in Fig. 7, wherein the image projection transfer section of the three-dimensional radar system is illustrated as employing optical transfer from the input sides of the storage systems to the output sides thereof. For this purpose, a cathode ray oscilloscope and a television camera unit are juxtaposed with an intermediate lens system to form each image transfer unit, and three such units are provided, including a plan projection unit and an east-west vertical plane projection unit, generally in the manner of Fig. 1-B; and further including a north-south vertical plane projection unit, for the reasons set forth above.

The radar section 11, 13 and the associated trigonometric voltage controlling arrangements of Fig. 1-A are employed in conjunction with the apparatus of Fig. 7. A first oscilloscope 201 is connected to receive deflection voltages corresponding to $r \cos \alpha$ and to $r \sin \alpha \sin \theta$, respectively. This oscilloscope 201, arranged for grid voltage control according to output impulses from the receiver output terminals 65 of unit 11, presents a pattern of luminous dots corresponding to the points of projection of various object positions upon the east-west vertical plane, i. e., upon the plane EFGH of Fig. 6. A second oscilloscope 203 having its intensity control terminals also connected to the radar receiver output terminals 65 is arranged for deflection of its electron beam according to $r \sin a \sin \theta$ and according to $r \sin a \cos \theta$, the unit 203 being arranged to present a scalar plan projection view of all of the detected objects. Thus, units 201 and 203 correspond closely to the input sections of storage tubes 101 and 103 respectively, of Fig. 1. A third oscilloscope 205 is arranged for vertical deflection according to $r \cos a$, and for horizontal deflection according to $r \sin a \cos \theta$. Accordingly, the oscilloscope 205 presents a view corresponding scalarly with the projection of the detected objects upon a north-south vertical plane, i. e., upon the north-south vertical median plane IJKL of Fig. 6.

Three television cameras 202, 204, and 206 are provided with their sensitive screens facing the fluorescent presentation screens of the oscilloscopes 201, 203 and 205 respectively. Television camera or pickup units 202 and 206 cooperate through a first coincidence circuit 207 to produce coincidence output signals only during moments of output from both camera units 202 and 206. The first coincidence circuit 207 and the remaining television camera 204 are in turn connected to the input circuits of a second coincidence circuit unit 209, so that unit 209 produces an output voltage only during a moment of output signals from all three of the television camera units. The output signals from coincidence circuit 209 are supplied to the intensity control terminals of a cathode ray oscilloscope 211 in the representation section 17', which is arranged to cooperate with a rotary mirror system 213 for the production of a three-dimensional volumetric image presentation in accordance with the principles of the aforementioned U. S. Patent 2,361,390.

The rotating mirror system 213 includes a motor 215 and a multiple-facet reflector disc 217 including a series of sectoral mirrors at successively higher axial positions in the direction of rotation of the motor 215. With this arrangement, and with rotation of the motor 215 at a speed of the order of 1200 revolutions per minute, the apparent image depth is varied through a selected distance range twenty times per second. If desired, the sectoral mirrors in the disc 217 may correspond in number with the number of horizontal sweep frames per cycle of rotation of the disc 217.

A capacitance-resistance circuit 219 supplied by a battery 221 through a momentary contact switch 223 may be arranged to provide a sawtooth voltage increasing cyclically in fixed-phase relation with the rotation of the mirror unit 217. This voltage is applied to the vertical deflection circuits of television camera units 202 and 206 for providing vertical scanning through the two vertical plane projection rasters thereof in synchronism with the vertical scanning in the presentation arrangement 211, 213.

A saw-tooth sweep generator 225 arranged to operate at a much higher frequency than the vertical scan frequency, e. g., to operate at a frequency of 600 cycles per second, is arranged to produce synchronous sweeps in television camera 202 about the horizontal axis (corresponding to substantially horizontal sweeps in plane EFGH, Fig. 6), in television camera unit 204 (corresponding to east-west sweeps in the plane ABCD), and in the image presentation oscilloscope 211. The saw-tooth sweep generator 225 may have a synchronization input circuit coupled to the depth-scan saw-tooth sweep circuit 219, if desired, for locking the frequency of unit 225 to a selected multiple of the vertical scan frequency.

A further saw-tooth sweep generator 229 is arranged to provide a linear sweep output voltage of a still higher order of frequency, e. g. of the order of 30,000 cycles per second. This generator is arranged to effectuate synchronous sweeping in cameras 204 and 206 and in the presentation oscilloscope 211 corresponding to the north-south direction in Fig. 6. Unit 229 may be arranged for operation at the frequency corresponding to a selected multiple of the sweep frequency of generator 225. The cathode ray tubes 231, 233 and 235 of the transfer unit oscilloscopes 201, 203 and 205 preferably are provided with long-persistence fluorescent screens, such that the images presented thereon are retained through appreciable time intervals, with very gradual diminution of intensity. Lenses 241, 243 and 245 are provided intermediate these screens and the photo-sensitive screens of the associated television camera units, for assuring reasonably high optical efficiency.

The diameter of the mirror wheel 217 is of a larger order of magnitude than the diameter of the fluorescent screen of oscilloscope 211, and the shaft of motor 215 is displaced from alignment with the cathode ray screen by a distance of the order of half the radius of the wheel 217. Preferably each of the sector mirrors in the wheels 217 has an area appreciably larger than the area of the fluorescent screen in oscilloscope 211, so that the three-dimensional volumetric image presentation may be viewed from a reasonably large range of viewpoints without objectionable distortion thereof. The fluorescent screen of the cathode ray tube in oscilloscope 211 is a very short-presistence screen.

The principles of operation of the three-dimensional object detection and indication system of Fig. 7 correspond generally to those of the arrangement in Fig. 1-B, except that the system in Fig. 7 is entirely free from ambiguities by virtue of use of three projection transfer units, and also is possessed of electronic isolation between the plane projection oscilloscopes and the arrangements for developing corresponding signals according to the plane projections and actuating the presentation oscilloscope accordingly, this latter feature resulting from use of electronic-optical transducers 231, 233, 235, and optical-electronic transducers 202, 204 and 206. With this isolation feature, there can be no deteriorating, as through electron charge spreading or charge weakening, of the stored plane-projection images as a result of repeated scannings in the television camera units or output portions of the signal transfer section 15'. Of course, the images presented on the fluorescent screens on cathode ray oscilloscopes 201, 203 and 205 are of gradually diminishing intensity after each rejuvenation thereof at the successive moments of alignment of antenna 21, 23 (Fig. 1-A) toward an object, but the television camera units 202, 204 and 206 are arranged to supply full output signals even with reasonably weak image intensity values on the corresponding oscilloscope screens, and hence these diminutions do not seriously impair the performance of the three-dimensional presentation system.

It will be readily apparent that the references in the foregoing explanatory remarks to the east-west and north-south planes are merely illustrative and are of no special significance. It is not absolutely necessary that these directions be employed; any perpendicular reference planes may be made to correspond to the transfer unit screen projections.

While the present invention has been illustrated as employed for scanning a hemispherical volume of symmetry about a vertical axis through a fixed radar observation point, in an arrangement particularly advantageous for aircraft traffic control, it will be appreciated that the invention is not limited to such an application, but may be airborne or ship-borne, and may be operated about a horizontal axis or an inclined axis of aiming, if preferred, as for indicating only those objects or targets occupying a selected zone, e. g., a sectoral zone generally ahead of a craft as for anti-collision warning or for tactical purposes.

Where the term "radar" is employed in this specification and in the appended claims this term has reference to an object position determining system involving transmission of radio energy and reception of energy reflected or retransmitted from objects upon which some transmitted energy impinges, the radar system including directive scanning antenna means for distinguishing directions of the distant objects, and the object distance being determinable according to time delay between transmission and reception of the radio waves.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Three-dimensional object location apparatus comprising radar means for determining the distance and direction of each object in an extensive space volume, volumetric image presentation means for portraying images of successively greater distances from a reference point in space at recurrently increasing distances from a view point, and means for recurrently actuating said image presentation means momentarily at points in the presentation volume representing the positions of objects in space, said last named means comprising means coupled to and controlled by said distance and direction determining means and timed according to the recurrently increasing distance from said view-point for actuating said presentation means regularly at the object representation points, said means coupled to and controlled by said distance and direction determining means comprising means for receiving object positional data from said distance and direction determining means and for developing and retaining images positioned in accordance therewith, and means coupled to said volumetric image presentation means and operating synchronously with said recurrent variations of viewpoint distance for periodically supplying to said volumetric image presentation means actuating impulses corresponding with said object positions whereby said presentation means is actuated at points in the representation volume corresponding to the object positions in space.

2. Three-dimensional object location apparatus comprising radar means for determining the distance and direction of each object in an extensive space volume, volumetric image presentation means for portraying images of successively greater distances from a reference point in space at recurrently increasing distances from a view point, and means for recurrently actuating said image presentation means momentarily at points in the presentation volume representing the positions of objects in space, said last named means comprising means coupled to and controlled by said distance and direction determining means and timed according to the recurrently increasing distance from said viewpoint for actuating said presentation means regularly at the object representation points, said means coupled to and controlled by said distance and direction determining means comprising an electronic image storage tube having an input electron gun coupled to said distance and direction determining means and actuated thereby for production of electron images positioned according to object positions and also having an output electron gun coupled to said image presentation means and arranged for output electron beam deflection synchronously with the recurrent variations of viewpoint distance, said output electron gun including an electron collector electrode coupled to said image presentation means for actuation of said image presentation means in accordance with electron images traversed by said output electron beam.

3. In a system of the character described, radio object locating means, a plurality of multi-dimensional-image storage means responsive thereto, each of said plurality of image storage means providing a planar orthographic projection of object positions, and electronic indicating means jointly responsive to said plural image storage means to present a single three-dimensional positional representation of each object in a volumetric field of view.

4. In an airport traffic control system, radar means adapted to periodically scan a portion of space; image indicating means responsive thereto including image storage means having different input and output scanning frequencies; an electron-sensitive screen responsive to said image storage means to present plane views of successive altitudes; means to oscillate said electron-sensitive screen relative to an observer; and means to vary the view on said screen according to successive altitude views synchronously with the oscillation of said screen to thereby present a three-dimensional representation of the space above the airport.

5. In an object locating system, directive radar transmitting and receiving means, a plurality of image storage tubes, means responsive to said radar means for providing one substantially planar image projection of radar energy reflecting objects in one of said image storage tubes and for providing a transverse plane projection of said objects in another of said storage tubes, and cathode ray indicating means jointly responsive to said plural image storage means and including depth scanning means for presenting a scalar three-dimensional view of said objects.

6. In an object locating system, image pickup means; plural image storage means adapted to store transverse projection electrical representations of a multi-dimensional optical image; and indicating means including a cathode ray presentation device jointly responsive to said plural image storage means for presenting a multi-dimensional representation of said image, said last-named means including a mechanical scanner for modulation of the indicating means viewing distance.

7. In a radar object locating apparatus, image pickup means; image storage means adapted to store an electrical representation of a three-dimensional optical image; indicating means responsive thereto to present a three-dimensional representation comprising an electron sensitive screen, scanning means adapted to present successive planar or two-dimensional images on said screen, means to obtain information relative to the third dimension perpendicular to said planar images, and means to utilize said information to make said screen present to the eye of an observer a three-dimensional representation, said last-named means including a presentation surface and viewing distance modulating means therefor.

8. Three-dimensional object locating means comprising a radar system, three-dimensional indicating means responsive to said radar means comprising an electron-sensitive indicating screen and at least one image storage tube having a storage mosaic and input and output electron beam scanning means, the input scanning means being responsive to said radar means to deposit along the mosaic an electrical representation of an optical image in a first scanning frequency and in a first scanning pattern, and the output scanning means being adapted to transfer said electrical image representation to said electron-sensitive screen at a different scanning frequency and in a different scanning pattern, said three-dimensional indicating means comprising an oscilloscope having a viewing screen and means for point-illuminating said screen at positions within its area corresponding to the radar object positional data, and mechanical scanner means for modulating the viewpoint distance thereto.

9. Image means comprising radar three-dimensional image pickup means, image storage means comprising a plurality of image storage tubes responsive to said image pickup means, oscilloscopic image indicating means responsive to said image storage means for presenting a three-dimensional representation, and means for periodically scanning one of said storage tubes and said indicating means at a first set of scanning frequencies and for scanning another of said storage means at a set of scanning frequencies including a different frequency from those of said first set, and for scanning said indicating means at said different frequency, the scanning of said indicating means at said first set of frequencies and at said different frequency being accomplished synchronously with the respective scannings of said storage tubes.

10. In an object locating system, means including a radar transmitter and receiver and directive antenna for periodically scanning a portion of space, image storage means adapted to store electrical charges in patterns corresponding to optical projections in parallel planes, second image storage means adapted to store an electrical representation of an optical projection in a plane perpendicular to said first planes and cathode ray tube indicating means responsive thereto to present a three-dimensional view of said portion of space and to display the radar objects in their scalar space positions in a miniature viewing volume.

11. Visual position indicating apparatus for showing three-dimensional images of objects located at progressively greater distances from a viewing station comprising radar means and image storage means responsive thereto for providing the positional data of said objects, an electron-sensitive screen, means for impressing upon said electron-sensitive screen images of said objects located in accordance with said positional data, oscillating means for moving said electron-sensitive screen backward and forward relative to the location of an observer at a rate sufficient to form persisting images within the volume swept through by said electron-sensitive screen.

12. Visual position indicating apparatus for showing three-dimensional images of objects located at progressively greater distances from a viewing station comprising three-dimensional image pickup means and three-dimensional-image storage means for providing the positional data of said objects, an electron-sensitive screen, means for impressing upon said electron-sensitive screen images of said objects located in accordance with said positional data, and oscillating means for moving said electron-sensitive screen backward and forward relative to the location of an observer at a rate sufficient to form persisting images within the volume swept through by said electron-sensitive screen.

13. In an object locating system, means including a radar transmitter and receiver and directive antenna means for periodically scanning a space zone and detecting energy reflections from objects therein, means responsive thereto including a plurality of image storage means having different input and output scanning patterns and having different frequencies, different ones of said storage means receiving different projections of the positions of radar targets, and means including a cathode ray tube and a visual depth scan mechanism for presenting in a space volume a three-dimensional representation of objects as located in said zone, said presentation means being responsive to said plurality of image storage means to receive the output components thereof.

JOHN L. PETERS.
ERIC J. ISBISTER.

References Cited in the file of this patent

UNITED STATES PATENTS

| Number | Name | Date |
|---|---|---|
| 2,361,390 | Ferrill | Oct. 31, 1944 |
| 2,403,562 | Smith | July 9, 1946 |
| 2,408,050 | De Rosa | Sept. 24, 1946 |
| 2,412,669 | Bedford | Dec. 17, 1946 |
| 2,417,446 | Reynolds | Mar. 18, 1947 |
| 2,426,979 | Ayres | Sept. 9, 1947 |
| 2,430,038 | Wertz | Nov. 4, 1947 |
| 2,434,897 | Ayres | Jan. 27, 1948 |
| 2,459,481 | Wolff | Jan. 18, 1949 |
| 2,459,482 | Bond | Jan. 18, 1949 |
| 2,477,651 | Ranger | Aug. 2, 1949 |
| 2,480,068 | Wolff | Aug. 23, 1949 |
| 2,514,828 | Ayres | July 11, 1950 |

FOREIGN PATENTS

| Number | Country | Date |
|---|---|---|
| 733,118 | France | Sept. 30, 1932 |
| 573,008 | Great Britain | Nov. 1, 1945 |